United States Patent [19]

Kennedy, Jr.

[11] Patent Number: 5,559,864
[45] Date of Patent: *Sep. 24, 1996

[54] CELLULAR BASED TRAFFIC SENSOR SYSTEM

[75] Inventor: Joseph P. Kennedy, Jr., Great Falls, Va.

[73] Assignee: E-Systems, Inc., Dallas, Tex.

[*] Notice: The term of this patent shall not extend beyond the expiration date of Pat. No. 5,465,289.

[21] Appl. No.: 460,852

[22] Filed: Jun. 5, 1995

Related U.S. Application Data

[63] Continuation of Ser. No. 26,568, Mar. 5, 1993.
[51] Int. Cl.⁶ .................................................. H04Q 7/20
[52] U.S. Cl. .................. 379/59; 379/63; 379/45; 340/908
[58] Field of Search .................. 379/58, 59, 60, 379/63, 45, 40, 41, 51; 340/933, 934, 935, 906, 907, 908, 909, 910, 988, 989, 990, 992, 993

[56] References Cited

U.S. PATENT DOCUMENTS

| | | | |
|---|---|---|---|
| 5,023,900 | 6/1991 | Taylor et al. | 379/59 X |
| 5,388,147 | 2/1995 | Grimes | 379/59 |
| 5,479,482 | 12/1995 | Grimes | 379/59 |

*Primary Examiner*—Curtis Kuntz
*Assistant Examiner*—G. J. Oehling
*Attorney, Agent, or Firm*—Harold E. Meier

[57] ABSTRACT

A method for providing emergency information using presently existing cellular telephone system technology. Traffic sensors monitor the control and voice channel transmissions of cellular units within a cellular telephone system for emergency conditions. Data from these transmissions is extracted and analyzed for emergencies according to a statistical model and derived vehicle geolocating information to generate emergency information that is transmitted to a central control center. By combining the information from all of the traffic sensors and each individual cell within a cellular telephone system, a picture of the emergency conditions existing along major thoroughfares may be determined.

10 Claims, 6 Drawing Sheets

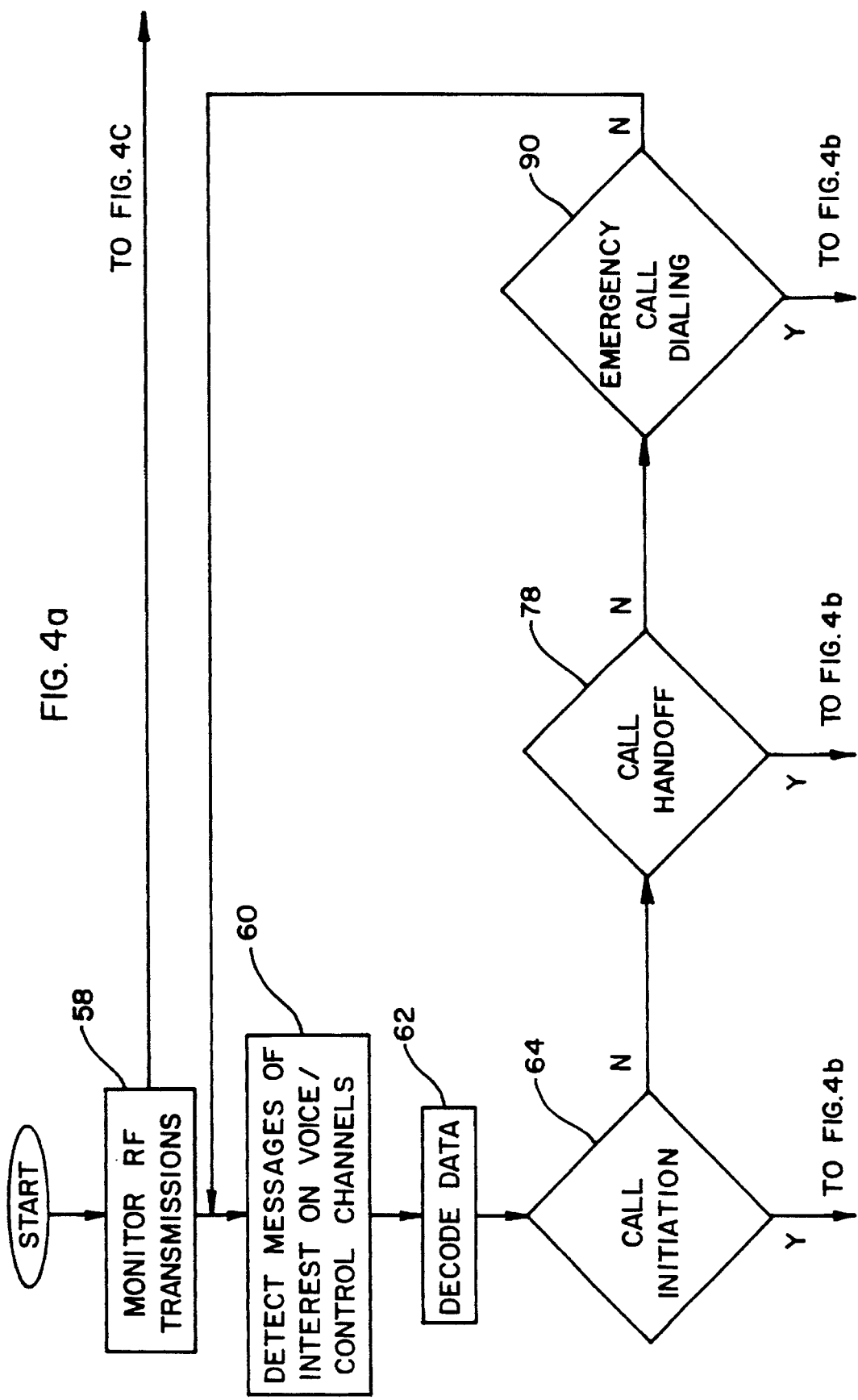

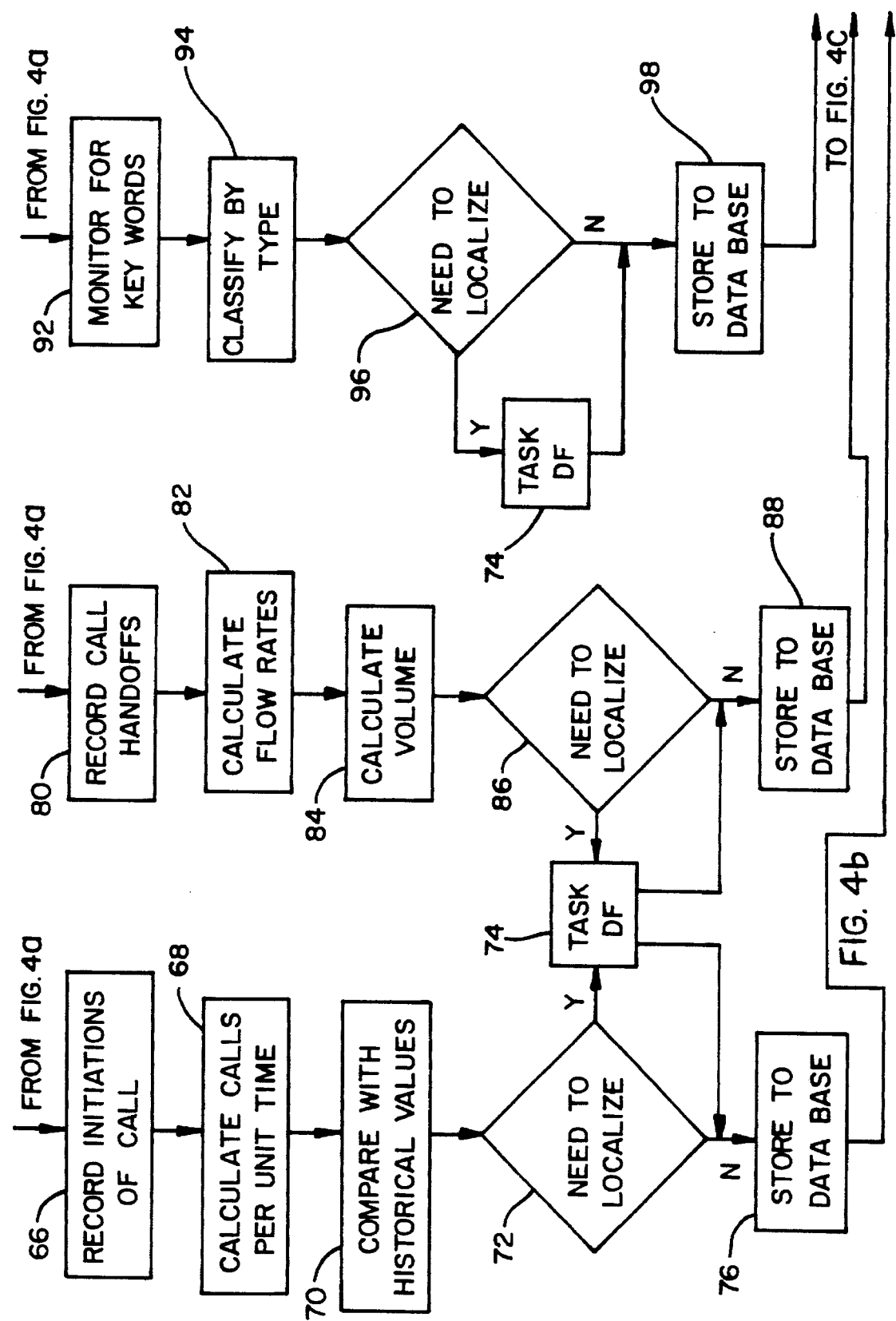

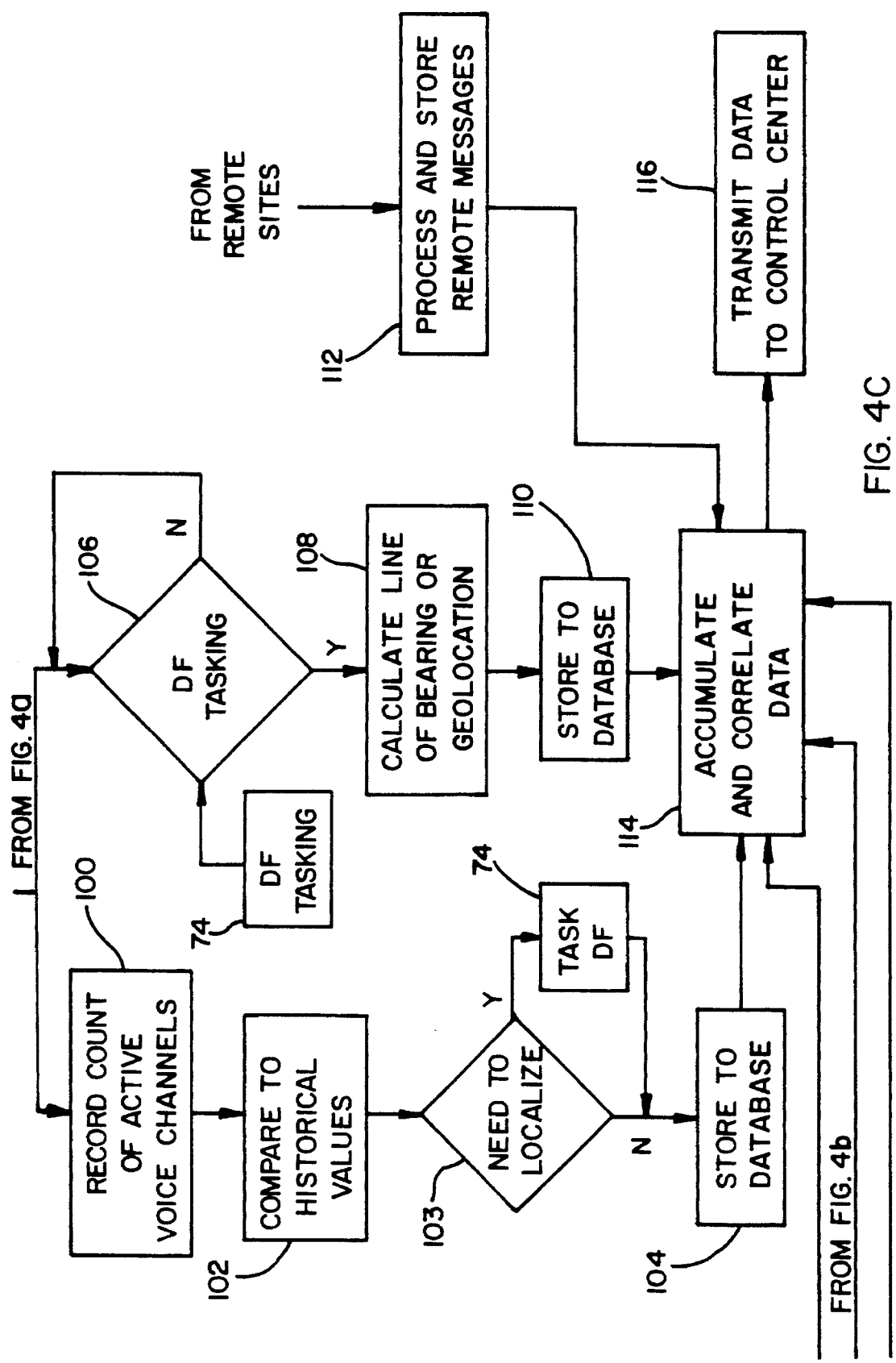

5,559,864

CELLULAR BASED TRAFFIC SENSOR SYSTEM

This is a continuation of pending application Ser. No. 08/026,568 filed Mar. 5, 1993.

TECHNICAL FIELD

This invasion relates to traffic detection systems and, more particularly, to a system for generating information on vehicular traffic utilizing existing cellular communication systems.

BACKGROUND OF THE INVENTION

A growing problem in this country is the increasing traffic congestion in large metropolitan areas. This problem has lead to traffic congestion in and around large metropolitan areas. Current approaches to monitoring of traffic conditions require either a significant amount of man power or expensive equipment.

One method of traffic monitoring uses visual sightings to gather information on traffic conditions. The visual sightings are accomplished by human monitors on the roadside or in probe vehicles traveling with traffic. Individuals observe traffic conditions at their location and pass this information on to some central reporting authority. The visual sighting method may also utilize aircraft, satellites, or remote video cameras to observe traffic conditions. This method of information gathering has two draw backs. First, the use of mechanical observation devices requires a significant investment in equipment to the information gathering service. Also, a human observer is still required to observe the traffic from an aircraft or to interpret the visual signals of the traffic transmitted by a camera or satellite.

A second technique for monitoring traffic uses sensors installed in, on or near roadways. Monitoring devices of this type include magnetic sensors placed within a roadway, infrared radiation sensors, or radar sensors. These types of sensors require a considerable amount of equipment to be installed along the roadways to be monitored. The purchase and installation of this type of equipment can comprise significant cost to the traffic monitoring service. Furthermore, expensive communications apparatus must be installed for transmitting data from the sensors to a central traffic planner or route controller. Thus, a need has arisen for a system that monitors traffic conditions without requiring substantial investments of man power and equipment.

SUMMARY OF THE INVENTION

The present invention overcomes the foregoing and other problems with a system for monitoring traffic conditions that utilizes information generated by existing cellular systems to determine the traffic conditions. The system monitors the RF signals transmitted over the control and voice channels of a cellular telephone network. These signals are decoded and processed to extract information such as the number of call initiations, calls in process, cell handoffs, and geolocation of mobile units within a particular cell area. A central processing unit performs statistical analysis of the data to determine whether the traffic conditions within a particular area are normal for the existing time of day and generate a report of the traffic conditions. The system also monitors for the transmission of emergency numbers. When an emergency number is detected, the signal is evaluated for key words and a determination of the type emergency is made. The information gathered is transmitted to a central receiving unit where the information is displayed to a system operator and may be utilized by the public.

BRIEF DESCRIPTION OF THE DRAWINGS

For a more complete understanding of the present invention and the advantages thereof, reference is now made to the following detailed description taken in conjunction with the accompanying drawings in which:

FIGS. 4a–4c are flow diagrams illustrating the operation of the present invention.

DETAILED DESCRIPTION OF THE INVENTION

Figure 1:
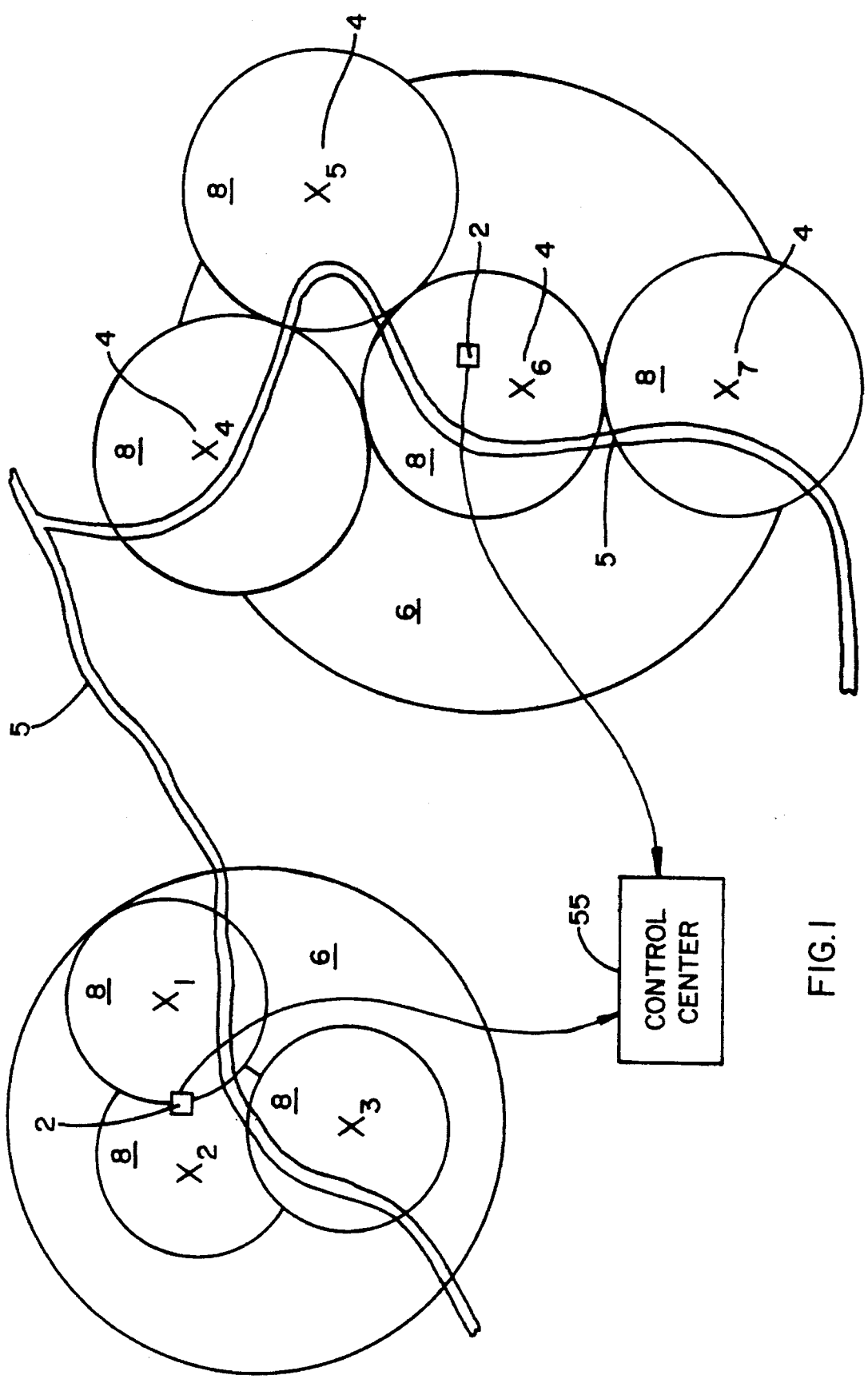
FIG. 1 is an illustration of traffic monitoring patterns for the system of the present invention.

Referring now to the drawings and, more particularly, to FIG. 1, there is illustrated the traffic monitoring areas for the system of the present invention. Traffic sensors 2 are placed at locations within the traffic area to be monitored. The traffic sensors 2 are placed such that the transmissions from all cellular towers 4 and mobile units (not shown) on a main roadway 5 can be received. In virtually all cases, the number of traffic sensors 2 will be less than the number of cellular towers 4 in a sensor coverage area 6. This is due to the fact that the size of a sensor coverage area 6 will be greater than the cellular coverage area 8 of an individual cellular tower 4. The cellular coverage areas 8 for each cellular tower 4 have been greatly simplified in FIG. 1. Actual contours are very irregular and typically governed by radio wave obstructions, reflectors and the actual highway system in question. The irregularity of the cellular coverage areas 8 may aid in the traffic monitoring process in individual cases.

Figure 2:
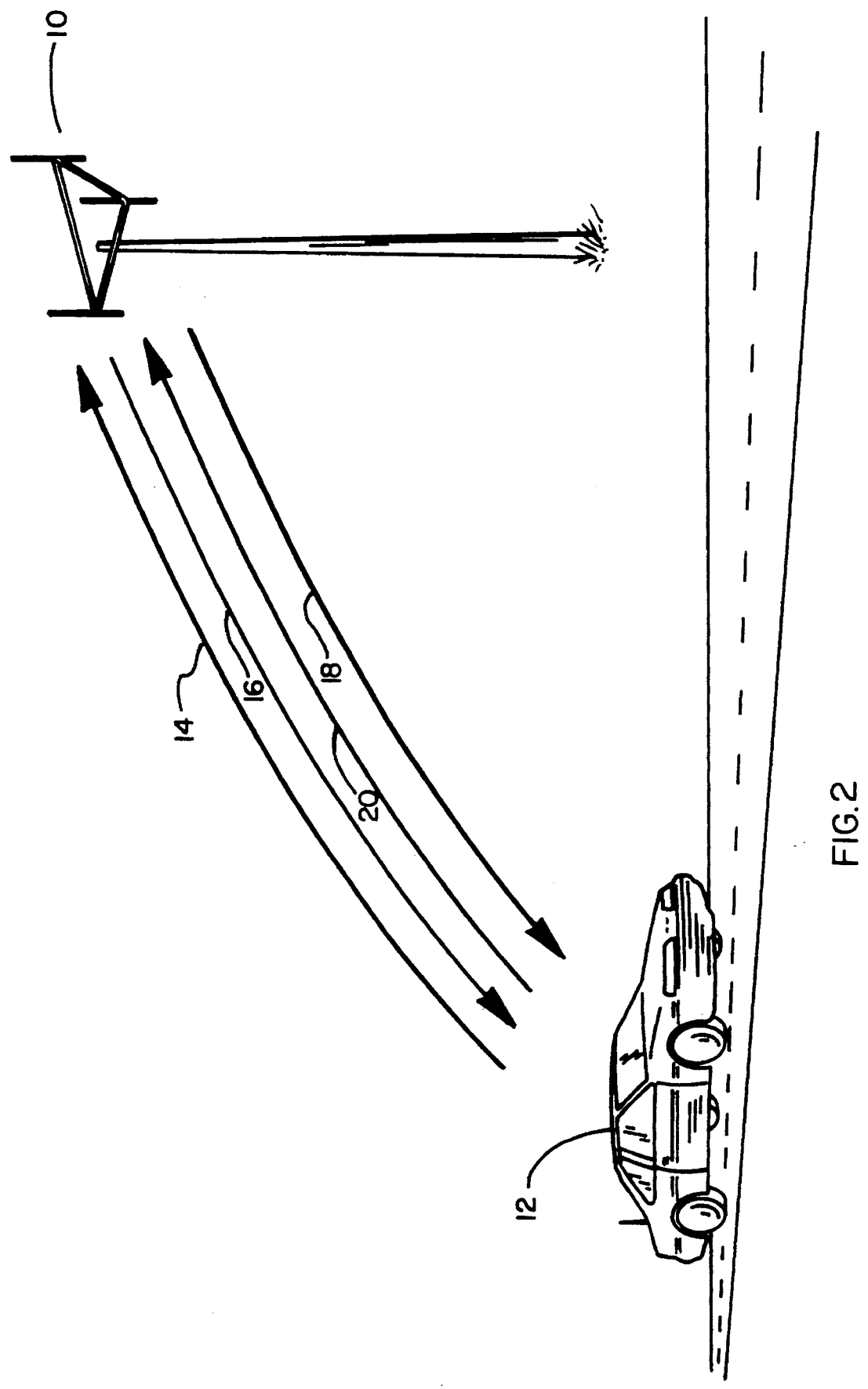
FIG. 2 is an illustration of the operation of presently existing cellular systems.

Referring now to FIG. 2, there is shown a diagram illustrating the operation of current U.S. cellular systems. Presently existing cellular radio systems operate using four types of channels. Forward channels transmit from the cell site 10 to a mobile unit 12. Reverse channels transmit from the mobile unit 12 to the cell site 10. The forward control channel 16 and the reverse control channel 14 use FSK modulation and pass TDM digital messages. The reverse control channel 14 transmits digital control data from the mobile unit 12 to the cell site 10. Information transmitted includes the phone number of the mobile unit 12, the serial number of the mobile unit (used for billing purposes) and the number being called by the mobile unit. The forward control channel 16 transmits information such as the control number of the mobile unit 12 and the reverse and forward voice channel frequency assignments for a cell. Forward voice channel 18 and the reverse voice channel 20 carry analogue narrow-band FM voice signals between the cell site 10, the mobile unit 12 and cell handoff data. The RF frequencies used by a cell site 10 are fixed and are used to associate calls with a particular cell site.

To initiate a call, a user dials the called number on the mobile unit 12 and pushes a send button on a hand set This causes a message to be transmitted on the reverse control channel 14 from the mobile unit 12 to the cell site 10. The message contains the mobile phone number, the called number and the electronic serial number (ESN) of the mobile unit 12. When the cell site 10 receives the message, the ESN is checked to make sure it is valid, and the call is initiated through the local telephone exchange. Once a call is connected, the cell site 10 sends a message on the forward control channel 18 to the mobile unit 12. The message includes the ESN of the mobile unit, the phone number of the mobile unit and the voice channel frequency assignments for the local cell site 10 to the mobile unit 12. The mobile unit 12 tunes to the forward and reverse voice channels 18 and 20 assigned to the cell site 10 and the call commences. When a call is initiated through the cell site 10, a similar procedure takes place.

When the mobile unit 12 travels out of the coverage area of a cell site 10, the mobile unit 12 goes to another set of voice channel frequencies associated with an adjacent cell site 10. This is accomplished by transmitting instructions on the forward voice channel 18 to the mobile unit 12 informing the mobile unit of the new channel frequencies of the adjacent cell. The adjacent cell site 10 will have already set up the call on the new voice channel frequencies when the mobile unit 12 makes the frequency changes. These cell site handoffs typically occur near the same location on a roadway. Thus, if detected, the location of the mobile unit 12 and direction of travel can be estimated.

In addition to the cellular radio traffic described herein periodic on-hook communications occur between the mobile unit 12 and cell site 10 for cellular system housekeeping purposes. These transmissions allow geolocation of mobile units 12 even when active voice conversations are not on-going.

Figure 3:
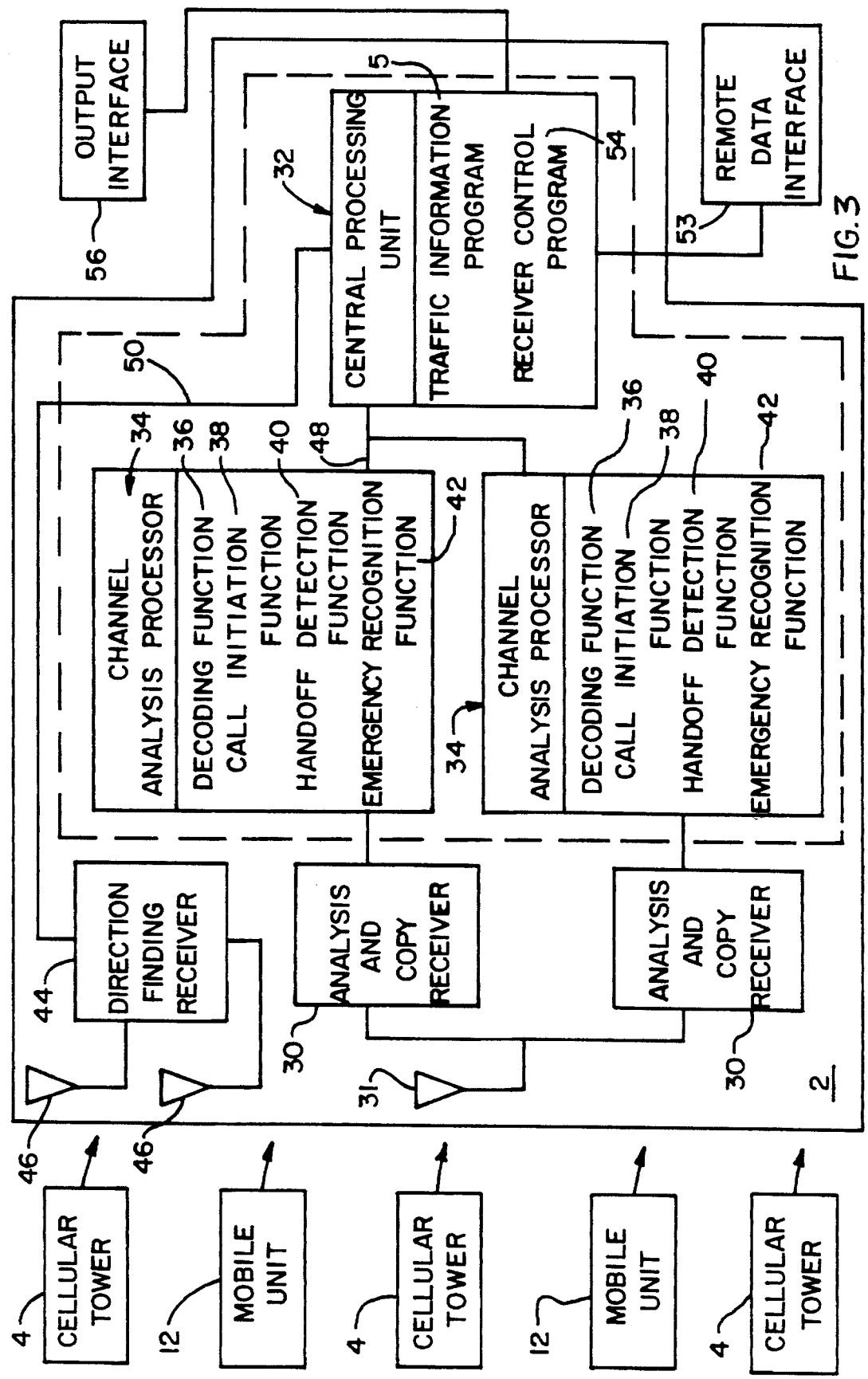
FIG. 3 is a block diagram of the receiving and processing equipment of a traffic sensor.

Referring now to FIG. 3, there is illustrated a block diagram of the traffic sensor 2 and associated cellular towers 4 and mobile units 12. Analysis and copy receivers 30 monitor the cellular RF transmissions and generate as an output FM demodulated data or speech signals. The transmissions are received from the cellular towers 4 and the mobile units 12 via antenna 31. The number of analysis and copy receivers 30 is variable and depends on the number of cellular towers 4 capable of being received and the number of receivers required to follow the ingress and egress of calls from a cell. A typical configuration would be sixteen receivers. The receivers 30 are individually controlled by a central processing unit 32 to the voice and command channels of the cellular towers 4 within the active area of the traffic sensor 2.

FM demodulated data from each analysis and copy receiver 30 is transmitted to a corresponding channel analysis processor 34. The channel analysis processors 34 are programmed to perform several functions to prepare the detected data for statistical analysis by the central processing unit 32. A decoding function 36 decodes the FM demodulated data from the analysis and copy receivers 30. A call initiation function 38 detects the initiation of a call within a cell and records the call initiation in a data file in the central processing unit 32. A handoff detection function 40 detects call handoffs to and from a cell and records the handoffs in a data file of the central processing unit 32. Decoding of message data is accomplished by synchronizing with the incoming 10 Kbits/sec data stream, detecting message sync (dotting) within the data stream, and then screening message identification fields for messages of interest (call initiations, handoffs, registrations, etc.) Messages of interest are collected and stored in a buffer for further analysis of content.

An emergency recognition function 42 monitors for the dialing of an emergency number over the command channels. When the dialing of an emergency number is detected, the emergency recognition function 42 evaluates the call for key words indicating the type of emergency. The emergency information is then forwarded to the central processing unit 32. Emergency number dialing is detected by screening reverse control channel call initiation messages for destination phone numbers of interest. The numbers are contained in a fixed field in the call initiation message. The numbers of interest (911, local police, fire, towing, etc.) can be programmed into the system based on location of usage.

The central processing unit 32 also receives data from a direction finding (DF) receiver 44. The DF receiver 44 responds to line of bearing data or collects coherent data on RF transmissions of interest in response to commands from the central processing unit 32. Data on specific RF transmissions is taken with the multi-element antenna 46 of the DF receiver 44. The collected data is transmitted to the central processing unit 32 to be used in the generation of traffic reports.

The central processing unit 32 receives data from the channel analysis processors 34 over line 48 and from the DF receiver 44 over line 50. A traffic information generation program 52 within the central processing unit 32 analyzes the data and calculates vehicular traffic reports. Traffic report information is generated by comparing call initiations and calls in process in a cell to historical levels to determine if a potential incidence exists. If initiations or active calls exceed threshold, the location is refined based on cell boundary data, roadway map data, or ancillary geolocation data of mobiles in-area. Once the location of the congestion is localized, a report is generated.

Vehicle count and flow rate data is generated from cell to cell handoffs and geolocation data. Handoffs into and out of cells generally occur at the same position on the roadway. Handoffs can be accumulated per unit time to estimate vehicle count on a roadway. Time between handoffs and knowing the distance traveled allows a determination flow rate to be made. Geolocation of vehicles over time can also yield flow rate. Geolocation also allows handoff data to be localized to a particular roadway. Periodic reports are generated for the roadways under surveillance.

Emergency call initiations indicate traffic encumbering incidences on the roadway. Integration of call initiation, calls in process, handoffs, geolocation, and emergency call initiations can yield accurate information on traffic incidences, flow and count. The reports include the location of traffic congestion, or traffic encumbering incidences, the vehicle density on roadways, and the flow rate of vehicles on roadways in the areas of the cells under surveillance. This information is generated based upon statistical analysis of the data received from the channel analysis processors 34 and the DF receiver 44.

Remote data can also be received over a remote data interface 53 from other surveillance sites operating in the area under surveillance. This data can be integrated with the local products for report generation. Of particular value is remote DF receiver generated lines of bearing or coherent data which can be used to geolocate mobile units very accurately. The central processing unit 32 also contains a receiver control program 54. The receiver control program 54 controls the frequencies to which the DF receiver 44 and analysis and copy receivers 30 are controlled allowing the traffic sensor 2 to tune to each individual cellular tower 4 within a coverage area.

Finally, the vehicular traffic reports generated within the central processing unit 32 are sent to a control center 55 (FIG. 1) via an output interface 56. The output interface 56 may be to standard telephone lines, RF transmission equipment or any other means of data transmission.

Referring now to FIGS. 4a through 4c, there is shown a flow diagram illustrating the operation of the present invention. As the equipment of FIG. 3 monitors at step 58 the RF transmissions of the cellular telephone system, voice and data transmissions are detected at step 60 over the control and voice channels. The detected transmissions are decoded at step 62 into speech or data signals. The decoded data is then analyzed by a series of inquiries beginning at step 64 wherein a determination is made if any call initiations have occurred in a cell within the coverage area of the traffic sensor 2. If call initiations are detected from a cell, the number of call initiations is recorded at step 66. Next, the number of calls per unit time is calculated at step 68 and this value is compared with historical values at step 70. If inquiry step 72 determines there is a need to localize the data, the DF procedure is tasked at step 74. All the retrieved information on call initiations is then recorded at step 76 in the call initiation data file for that cell in the central processing unit 32.

Inquiry step 78 determines if any call handoffs were detected. The number of detected call handoffs to and from a cell is recorded at step 80. This information is then used to calculate at step 82 the flow rate of traffic through a cell area. The volume of traffic is calculated at step 84 from the same data. Inquiry step 86 determines if a need exists to localize the data and initiates DF tasking procedures at step 74, if required. All call handoff data is stored at step 88 in the call handoff data file for that cell in the central processing unit 32.

Inquiry step 90 determines if an emergency number dialing was detected. When an emergency call is detected, the central processing unit 32 begins monitoring the call at step 92 and searching for key words indicating the nature of the problem. A decision concerning the nature of the emergency and the emergency's effect on traffic conditions is then made and the call is classified by type at step 94. A determination is made whether to localize the data at inquiry step 96 and DF tasking procedures are initiated at step 74 if warranted. Otherwise, the emergency call information is stored in its associated data base at step 98.

Calls in progress are detected and counted at step 100 based on the detected voice and data signals. In a manner similar to the test for call initiations, the count of calls in progress is compared at step 102 to historical levels to determine if unusual levels of activity exist indicating a traffic problem. Inquiry step 103 next determines if there exists a need to localize the data by DF tasking. If required, the DF tasking procedures are initiated at step 74. If no DF tasking procedures are required or once the line of bearing information is acquired, the call in progress data is stored at step 104 in the active call database for that cell in the central processing unit 32.

This type of analysis is effective because certain types of traffic conditions drastically effect the number of call initiations. For example, as a traffic disturbance occurs, the number of call initiations surge. By comparing the number of measured calls per unit time against historical levels of call initiations, assessments of the likelihood of traffic problems are made. Estimates of the location of a traffic problem are made based on the location of the cells experiencing a surge.

At inquiry step 106, RF transmissions are continuously monitored until a command is received from step 74 to begin DF tasking procedures. Upon receipt of the DF tasking command, line of bearing or geolocation information is calculated at step 108. The DF or geolocation information calculated at step 108 can be derived from the local DF receiver 44 or from geolocation of mobile units 12 based on local and remotely generated data from other surveillance sight. The information is then stored at step 110 in a database within the central processing Unit 32. Data from remote sites may also be processed and stored in a similar manner at step 112.

All stored data concerning incidence detection, vehicle density and speed, etc. is accumulated and correlated into a comprehensive report at step 114. The information is then transmitted at step 116 to a data control center where the information is utilized by subscribing customers.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

I claim:

1. A method for providing vehicular traffic information, comprising the steps of:

monitoring signals on control and voice channels of a cellular telephone system by means of a plurality of receivers tuneable to a desired control or voice channel;

analyzing the signals monitored on the control and voice channels of the cellular telephone system for recognition of an emergency, the steps of analyzing the signals including:

detecting a preselected signal within the signals monitored on the control channels;

monitoring a voice channel for a preselected signal for key words indicating an emergency;

classifying the emergency in response to the detected key words; and generating vehicular traffic reports in response to analysis of the signals monitored on the control and voice channels.

2. The method of claim 1, further including collecting directional data concerning the signals monitored on the control and the voice channels.

3. The method of claim 1, wherein the step of analyzing includes decoding data contained within the signals monitored on the control and the voice channels.

4. The method of claim 1, wherein the step of monitoring signals further includes tuning each of the plurality of receivers to a selected channel.

5. The method of claim 1, further including transmitting vehicular traffic reports to a control center.

6. The method of claim 1, wherein the step of analyzing the signals includes detecting and recording call initiations.

7. The method of claim 6, wherein the step of generating vehicular traffic reports includes comparing the recorded call initiations with a predetermined level of call initiations to determine locations of traffic congestion.

8. The method of claim 1, wherein the step of analyzing the signals includes detecting and recording call handoffs.

9. The method of claim 8, wherein the step of generating vehicular traffic reports includes means for calculating the number of recorded call handoffs per unit time to determine a vehicular traffic count.

10. The system of claim 8, wherein the step of generating vehicular traffic reports further includes calculating the time between detected call handoffs to determine a vehicular traffic flow rate.

\* \* \* \* \*